United States Patent

Junod

(10) Patent No.: US 8,595,498 B2
(45) Date of Patent: Nov. 26, 2013

(54) METHOD FOR AUTHENTICATING ACCESS TO A SECURED CHIP BY TEST DEVICE

(75) Inventor: Pascal Junod, Vufflens-le-Ville (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 49 days.

(21) Appl. No.: 13/320,161

(22) PCT Filed: May 11, 2010

(86) PCT No.: PCT/EP2010/056409
§ 371 (c)(1),
(2), (4) Date: Nov. 11, 2011

(87) PCT Pub. No.: WO2010/130709
PCT Pub. Date: Nov. 18, 2010

(65) Prior Publication Data
US 2012/0069991 A1    Mar. 22, 2012

(30) Foreign Application Priority Data

May 13, 2009    (EP) .................................... 09160096

(51) Int. Cl.
*H04L 9/32*    (2006.01)

(52) U.S. Cl.
USPC .............................................. 713/170; 380/2

(58) Field of Classification Search
USPC .................. 713/168–170, 180, 181; 726/2–4
See application file for complete search history.

(56) References Cited

U.S. PATENT DOCUMENTS 6,769,060 B1 *   7/2004   Dent et al. .................... 713/168
2004/0193890 A1   9/2004   Girault (Continued)

FOREIGN PATENT DOCUMENTS

| EP | 1 392 052 | 2/2004 |
|----|-----------|--------|
| EP | 1 441 313 | 7/2004 |

(Continued)

OTHER PUBLICATIONS

International Search Report issued in International Application No. PCT/EP2010/056409, mailed Jul. 6, 2010.

(Continued)

*Primary Examiner* — Nirav B Patel
(74) *Attorney, Agent, or Firm* — DLA Piper LLP US

(57) ABSTRACT

A method for authenticating access to a secured chip SC by a test device TD, the test device storing at least one common key CK and one test key TK, the secured chip SC storing the same common key CK and a reference digest F(TK) resulting from a cryptographic function on the test key TK, the method comprising the steps of:—receiving, by the test device TD, a challenge R produced by the secured chip SC,—combining, by the test device TD, the received challenge R with the test key TK by applying a bidirectional mathematical operation (op), encrypting the result (TK op R) with the common key CK, obtaining a cryptogram CK(TK op R),—sending the cryptogram CK(TK op R) to the secured chip SC—decrypting, by the secured chip SC, the cryptogram CK(TK op R) with the common key CK, obtaining an image key TK' representing the test key TK by applying, with the challenge R, the reverse operation (op-1) of the mathematical operation (op) previously used by the test device TD,—calculating an expected digest F(TK') of the image key TK' with a cryptographic one-way function,—verifying validity by comparing the expected digest F(TK') with the reference digest F(TK),— if the result of the comparison between the digest F(TK') of the image key TK' and the reference digest F(TK) is positive, accessing, by the test device TD, the secure chip SC in a test mode.

12 Claims, 2 Drawing Sheets

(56) References Cited

U.S. PATENT DOCUMENTS

2005/0066168 A1* 3/2005 Walmsley .................. 713/169
2006/0036857 A1* 2/2006 Hwang ...................... 713/168
2008/0263362 A1* 10/2008 Chen ........................ 713/184

FOREIGN PATENT DOCUMENTS

EP          1 983 466        10/2008
WO    WO 2005/125078    12/2005

OTHER PUBLICATIONS

Written Opinion issued in International Application No. PCT/EP2010/056409, mailed Jul. 6, 2010.

A. Menezes et al., "Chapter 10: Identification and Entity Authenitcation"; Handbook on Applied Cryptography, CRC Press, Inc, pp. 385-424 (Oct. 1, 1996).

English language abstract of EP 1 441 313, published Jul. 28, 2004.

* cited by examiner

METHOD FOR AUTHENTICATING ACCESS TO A SECURED CHIP BY TEST DEVICE

FILED OF THE INVENTION

The invention relates to the domain of protecting the access to a secured chip in particular with a test device by preventing unauthorized operations on data stored in memories of the chip.

TECHNICAL BACKGROUND

Secured chips are mostly used in manufacturing of smart cards, security modules, identification devices and other integrated circuits used in applications requiring a high security level.

A secured access to a device or to a distant unit may be authorized by using preferably a one time password introduced on a user terminal unit in response to a challenge sent by the device or the distant unit. For example, document WO2005125078 describes a method for securely communicating between a central location and at least one client station, comprising the steps of: generating an initial secret and storing the same in the central location; generating a set of one-time passwords, each of the one-time passwords being associated with an index; storing a subset of the set of one time passwords in the client station; sending a challenge to the client station from the central location, wherein said challenge is an index of said subset of the set of one- time passwords; sending from the client station to the central location the one-time password associated with the index.

Document EP1392052 describes methods for controlling access to device functions including the steps of receiving a request to enable the feature of the device; determining whether the feature is disabled; determining whether the feature can be enabled with authorization; determining whether a requestor is authorized to enable the feature of the device. When all the conditions are fulfilled by the device and the requestor the feature can be enabled. The authorization may be obtained by generating a challenge value by the device, storing the challenge value, sending the challenge value to the requestor, encrypting the challenge value by the requestor, sending the encrypted challenge value back to the device, decrypting the encrypted challenge value by the device, and comparing the stored challenge value with the decrypted challenge value. If the two values of the challenge are equal, the authorization for enabling the feature is given.

The document EP1441313 handles on an asymmetrical cryptographic method of protecting a hard-wired electronic logic chip against fraud in transactions between the electronic chip and an application including calculating an authentication value from input parameters in the electronic chip. The method comprises the steps of: producing by the chip a random number specific to the transaction; sending to the application a first parameter calculated by the application prior to the transaction, linked to the random number by a mathematical relationship, and stored in a data memory of the chip; calculating by the chip a second parameter constituting an authentication value by means of a serial function whose input parameters are at least the random number specific to the transaction and a private key belonging to an asymmetrical key pair; sending the authentication value to the application, and verifying said authentication value by means of a verification function whose input parameters consist exclusively of public parameters including at least the public key.

The document EP1983466 describes method and apparatus of secure authentication for system on a chip (SoC). The SoC may enable authentication of an external entity attempting to gain access to a function or system. The SoC and an authorized external entity may each have knowledge of hidden data prior to an authentication attempt and may communicate data during the authentication process as well. Using like data, the SoC and external entity may be able to generate the same password and achieve system access. Passwords may be unique in two ways, for example: per operation and per SoC device. A random number generator on board the SoC may enable the passwords to vary for each iteration of the authentication process. Each instance of a SoC has its own secret word allowing passwords to be unique for each device.

The security of the access authentication methods of the prior art may be compromised either by reverse engineering or tampering the keys of the protected chip or by listening or tapping communication between the accessing device and the chip. In fact, several known attacks such as brute force attacks, signal analysis, physical examination of the chip, etc. allow discovering encryption keys and deducing the challenges or other parameters used for creating the one time passwords. In some other cases, the device authentication process creates data sets transmitted from the device to the chip and vice-versa which may disclose important security parameters when captured and analyzed by a third party device.

SUMMARY OF THE INVENTION

The aim of the invention is to authenticate an access to a secured chip by a test device with a maximum security level by using a fast, efficient and attacks resistant process. For example tampering key from the test device or from the chip will not give sufficient results for obtaining access to the chip. Furthermore datasets captured during authentication will not disclose any key or cryptogram useful to simulate an access authorization to the chip.

The aim is achieved by a method for authenticating access to a secured chip by a test device, the test device storing at least one common key and one test key, the secured chip storing the same common key and a reference digest resulting from an application of a cryptographic function on the test key, the method comprising the steps of:

receiving, by the test device, a challenge produced by the secured chip, combining, by the test device, the received challenge with the test key by applying a bidirectional mathematical operation, encrypting the result with the common key, obtaining a cryptogram, sending the cryptogram to the secured chip, decrypting, by the secured chip, the cryptogram with the common key, obtaining an image key representing the test key by applying, with the challenge, the reverse operation of the mathematical operation previously used by the test device, calculating an expected digest of the image key with a cryptographic one-way function, verifying validity by comparing the expected digest with the reference digest, if the result of the comparison between the digest of the image key and the reference digest is positive, accessing, by the test device, the secure chip in a test mode.

Before distribution on markets or for maintenance purposes, the various functionalities of the secured chip are tested with a test device accessing the chip in a secured manner. Once the test device is authenticated with the chip, i.e. successful verifications have been made by control data exchanges between the test device and the chip, the different operating tests or simulations are carried out on hardware and software functions and/or programs implemented in the chip. The test device can also comprise functionalities of configuration or customization of the chip by enabling, disabling or programming features according to the applications requirements foreseen for the chip.

The invention provides a method for resisting either against to an invasive attack of the chip or against to an attack such as snooping but not against both attacks combined together.

An invasive attack is a physical attack against the chip which will be destroyed and leaving detectible traces. Such an attack allows access on signals inside the chip, extracting data by means of reverse engineering, observation with a microscope and using tools such as a laser cutter or drill, probing needles and electron beam tester.

Snooping is a non-destructive data mining technique giving unauthorized access to data not necessarily during its transmission to external devices. This technique may also include observation of data changes by remotely monitoring computer activity through a network for example.

According to a preferred implementation, one advantage of the method is minimizing the data transfer between the test device and the secured chip. In response of a challenge produced by the chip, the test device sends a cryptogram which will be analyzed and verified by the chip before authorizing the test device to perform tests on said chip.

The challenge may be generated randomly by means of a hardware based generator integrated in the chip. In an embodiment, the chip may store a list of challenges usable only once. In another embodiment, the challenge may be in form of a number used only once or nonce produced by incrementing or decrementing monotonously a counter from a predefined value.

A capture of the challenge and/or the cryptogram by a third party device will not allow to find the test key necessary for verification by comparison with the digest stored in the chip assuming that the one-way function is known. In fact, the cryptogram obtained by encrypting with the common key a result of a combination of the challenge with the test key requires the knowledge of the common key, the test key and the bidirectional mathematical operation or function, respectively its inverse.

If the common key could be obtained by tampering the secured chip, reproducing the cryptogram will be rather difficult because it requires the knowledge of the test key. Contrarily to the common key, the test key is not stored in a non volatile memory of the secured chip.

BRIEF DESCRIPTION OF THE DRAWINGS

The invention will be better understood with the following detailed description, which refers to the attached figures given as non-limitative examples.

DETAILED DESCRIPTION OF THE INVENTION

Figure 1:
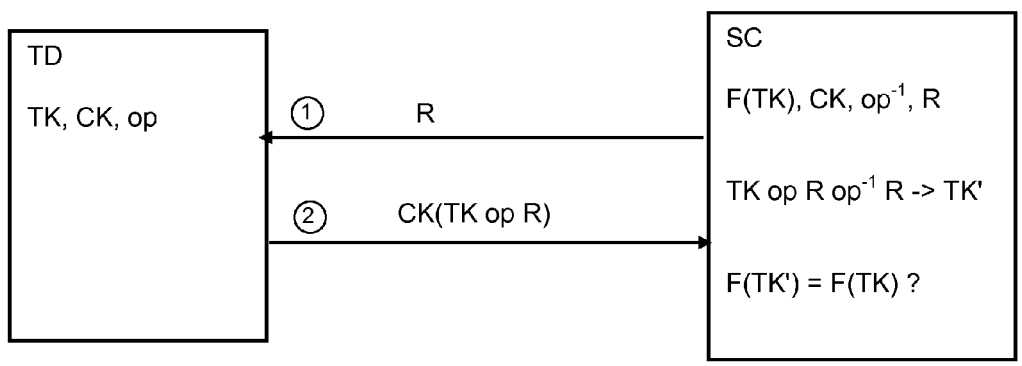
FIG. 1: shows a block diagram representing a test device connected to a secured chip with their respective stored keys, digest and functions. A cryptogram sent by the test device in response of a received challenge allows access to the secured chip.

The test device TD as shown in FIG. 1 stores in a non volatile memory identification data comprising a test key TK, a common key CK and a program able to combine an input data with the test key TK. The program includes a bidirectional (having an inverse) and bijective mathematical operation or function op to apply with a challenge R received by the test device TD from a secured chip SC connected to the test device TD for testing purposes. A function is bijective or a bijection or a one-to-one correspondence if it is both injective (no two values map to the same value) and surjective (for every element of the image domain there is some element of the start domain which maps to it). In other words, there is exactly one element of the start domain which maps to each element of the image domain.

The secured chip SC stores in a non volatile memory:
the common key CK,
a digest F(TK) of the test key TK obtained through a cryptographic one-way function F,
and a program able to apply on input data the inverse $op^{-1}$ of the operation or function op included in the program stored by the test device (TD).

These data among others have been introduced into the secured chip during personalization steps completing its manufacturing. The test device TD is then adapted to the chips available for testing by comprising all data required for authentication with the chips.

A digest may be defined as a result obtained by calculating with a cryptographic function applied on a data set by using a key i.e. the test key TK. Furthermore the secured chip comprises preferably a random generator for producing the challenge R intended to be sent to the test device TD and means for processing a cryptogram received from the test device in order to carry out the necessary verifications for authenticating the test device. Authenticating means that only the test device owning the necessary keys and programs is authorized to access the secured chip; other devices without the compatible identification data being excluded and unable to perform tests.

In a first step (1) the test device TD receives from the secured chip SC a challenge R which is combined to the test key TK thanks to the operation op of the stored program. The result (TK op R) thus obtained is encrypted with the common key CK for producing a cryptogram CK(TK op R). In a second step (2), the test device TD sends the cryptogram CK(TK op R) to the secured chip SC for processing.

The secured chip SC decrypts the cryptogram CK(TK op R) with the common key CK and obtains a result TK op R. As the challenge R is stored in a temporary memory of the generator, it is available as input data of the program including the inverse operation $op^{-1}$ applied with the challenge R on the result TK op R for obtaining an image TK' of the test key:

TK op R $op^{-1}$ R gives TK op I=TK, where I is the identity or neutral element for operation op and $op^{-1}$.

In another example, the operation may be adding the challenge R to the test key TK and its inverse will be subtracting the challenge R for obtaining the key TK.

TK+R−R gives TK+0=TK, 0 being the neutral element for addition and subtraction operations. A similar reasoning could be made with multiplication and division operations where the neutral element is 1.

In a particular case, the operation op may be the XOR operation which inverse $op^{-1}$ is the same XOR operation.

The obtained test key represents in a first time an image TK' of the real test key TK before verification has been executed.

According to a first embodiment, a cryptographic one-way function F such as a hash function of type SHA256 for example is applied on the image TK'. The obtained digest F(TK') is compared with the stored digest F(TK) previously calculated with the same one-way hash type function F at the personalization of the secured chip. When the compared values of the stored digest F(TK) and the image digest F(TK') are the same, the test key TK is valid and the test device TD is considered as authenticated by the secured chip SC and access for test purposes is authorized.

Figure 4:
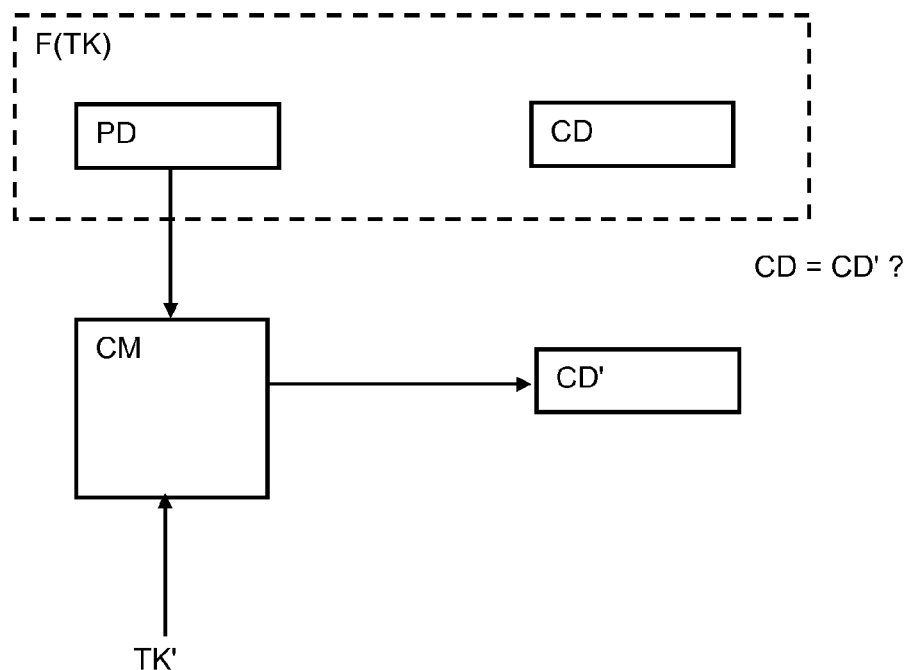
FIG. 4 shows a block diagram of a digest calculation process using an image test key encrypting a reference plain data set, the resulting image crypto data set being compared with a reference crypto data set.

According to a second embodiment, the reference digest F(TK) stored in the secured chip comprises a plain data set PD and a crypto data set CD. The image key TK' is used as a key in a cryptographic module CM in which the plain data set PD is applied for obtaining an image crypto data set CD'. The comparison is then made between the reference crypto data set CD of the reference digest F(TK) and the calculated image crypto data set CD' as schematically illustrated by FIG. 4.

In the following description, the digest may be of any type as mentioned in the two preceding embodiments.

Figure 2:
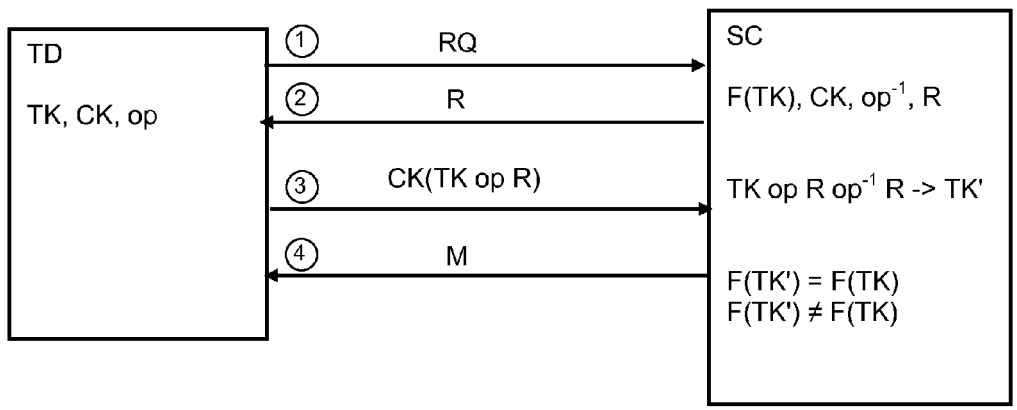
FIG. 2 shows the block diagram of FIG. 1 including additional data flowing between the test device and the secured chip as a request for testing and a response message.

According to an embodiment as illustrated by FIG. 2, the method of the invention may include a preliminary step (1) of sending a request (RQ) for authentication to the secured chip SC. Once the secured chip has received the request RQ it sends the challenge R to the test device TD in step (2) and receives the cryptogram CK (TK op R) from the test device TD in step (3).

Optionally, a response message M may be returned in step (4) to the test device TD after the secured chip SC has executed the verification of the cryptogram CK (TK op R). The message M indicates whether the authentication has been successful or not i.e. the values of the compared digests are the same F(TK')=F(TK) or different F(TK')≠F(TK). In the latter case, the access to the secured chip is blocked and according to an example a limited number of further attempts of authentication may be performed before a complete deactivation of the chip.

One or both of the additional steps (1) or (4) of FIG. 2 may be included in the method.

The challenge R produced by the secured chip may be generated by a hardware pseudo-random numbers generator or by an algorithm implemented in a stored generation program.

In a further embodiment the challenge may be produced by a counter which increments or decrements from a given start value at each connection of the test device to the secured chip or at each test request sent to said secured chip.

In a further embodiment the challenge may comprise a time stamp including the current date and hour with a predetermined precision (1 second, 100 milliseconds, 10 ms, 1 ms, etc.).

A combination of two or more of the preceding embodiments may also be possible for generating a challenge.

It has to be noted that the test and/or common keys (TK, CK) used in the method may be of symmetrical or asymmetrical type.

In another embodiment, the test key may derive from a unique identifier of the test device TD, while the common key may derive from a unique identifier of the secured chip SC.

In a further embodiment, the test device and the secured chip store a plurality of common keys. The test device may also store a plurality of test keys and the secured chip stores a plurality of digests calculated each with the corresponding test key stored in the test device.

Advantageously, an index may be associated to each test and common key in order to prevent the systematical trying of all stored keys for decryption and verification operations with the digest. Such attempts could slow down the authentication process in an undesirable way, particularly when the keys and digests are numerous.

The index may be a register reference or a memory address indicating where the common and test key are stored. The index may also be a rank number of a key in a set of keys stored in a non volatile memory. The test device determines either automatically the index or according to a sequence defined by a program or upon instructions input by a user.

Figure 3:
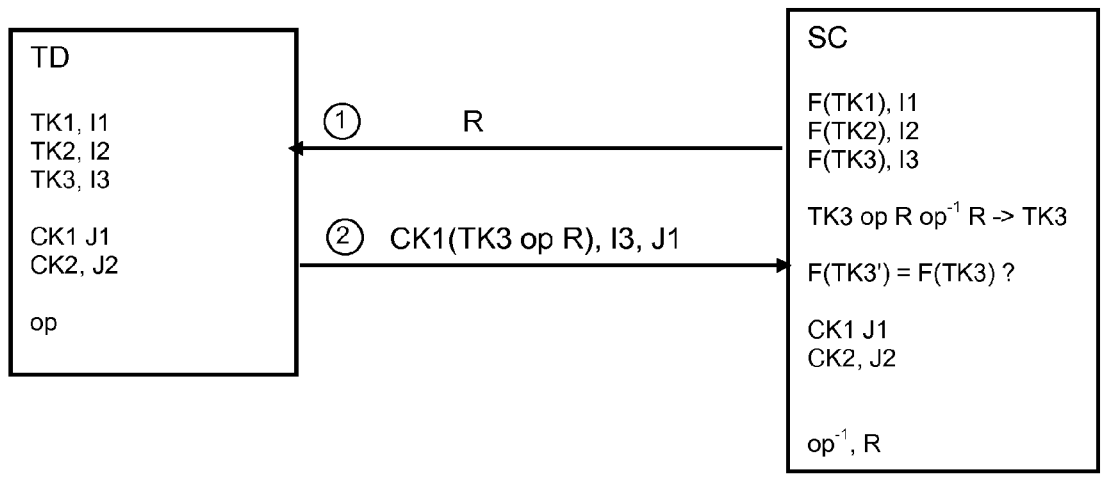
FIG. 3 shows the block diagram of FIG. 1 including additional test and common keys having each and index.

FIG. 3 illustrates an embodiment where the test device TD stores three test keys (TK1, TK2, TK3) and two common keys (CK1, CK2). The test and common keys are preferably each accompanied by a respective index (I1, I2, I3), (J1, J2) used for designating a specific key to be selected for processing authentication.

The secured chip SC stores the three digests of the test keys F(TK1), F(TK2) and F(TK3) accompanied by the index (I1, I2, I3) corresponding to the respective test keys. The common keys (CK1, CK2) are also stored with their index (J1, J2) as in the test device TD.

The cryptogram CK1(TK3 op R) sent from the test device in response to the received challenge R is accompanied by the index (I, J) of the keys used therein. In the example of FIG. 3, the cryptogram CK1(TK3 op R), is transmitted with the index I3 designating the test key TK3 and index J1 designating the common key CK1.

At reception of the cryptogram CK1(TK3 op R) by the secured chip SC, the index J1 is first read for selecting the correct common key CK1 to be used for decrypting the cryptogram CK1(TK3 op R). After obtaining the test key TK3 by applying the inverse operation $op^{-1}$ and calculating an image digest F(TK3'), the secured chip selects the stored reference digest F(TK3) designated by the received index I3. The comparison is then made between image and reference digests F(TK3') and F(TK3) corresponding to the third test key TK3 for authorizing the access to the secured chip SC by the test device TD if both digest values are identical.

It has to be noted that the keys and corresponding digest may be stored in any number in the test device and the secured chip.

According to an embodiment, the index I of the test key TK transmitted with the cryptogram CK1 (TK3 op R) may be encrypted by the common key CK which encrypts the result TK op R obtained by applying the operation op with the challenge R on the test key TK.

In the example, the data transmitted by the test device TD will then be: the cryptogram CK1 (TK3 op R), CK1 (I3), J1, where CK1 (I3) is the index of the test key TK3 encrypted with the common key CK1. At reception, the test device will decrypt the index I3 with the common key CK1 designated by the index J1. After decryption of the cryptogram CK1 (TK3 op R) with the common key CK1 and determining the test key TK3, the previously decrypted index I3 is then used to select the suitable digest F(TK3) for verifying validity of the test key TK3.

The invention claimed is:

1. A method for authenticating access to a secured chip by a test device, the method comprising steps of:
receiving, by the test device, a challenge produced by the secured chip, the test device storing at least one common key derived from a unique identifier of the secured chip, at least one test key derived from unique identifier of the test device and means for applying a bidirectional mathematical operation to the received challenge;

combining, by the test device, the received challenge with the test key by applying a bidirectional mathematical operation, encrypting, by the test device, a result of the bidirectional mathematical operation with the common key stored on the test device, to obtain a cryptogram;

sending by the test device, the cryptogram to the secured chip, the secured chip storing the same common key, a reference digest resulting from a cryptographic function on the test key and means for applying to the challenge a reverse operation of the bidirectional mathematical operation;

decrypting, by the secured chip, the cryptogram with the common key stored on the secured chip;

obtaining, by the secured chip, an image key representing the test key by applying, with the challenge, the reverse operation of the bidirectional mathematical operation previously used by the test device;

calculating, by the secured chip, an expected digest of the image key with a cryptographic one-way function;

verifying, by the secured chip, validity by comparing the expected digest with the reference digest; and if the result of the comparison between the digest of the image key and the reference digest is positive, accessing, by the test device, the secure chip in a test mode, wherein the challenge is produced by the secured chip using a hardware pseudo-random number generator or by an algorithm implemented in a stored generation program, or the challenge is produced by a counter which increments or decrements from a given start value at each connection of the test device to the secured chip or at each test request sent to said secured chip, or wherein the challenge comprises a time stamp including a current date and hour with a predetermined precision, and wherein the bidirectional mathematical operation comprises a logical addition, multiplication or XOR operation.

2. The method according to claim 1 wherein the expected digest is obtained by applying a hash function on the image key.

3. The method according to claim 1 wherein the reference digest comprises a plain data set and a crypto data set, the image key being used as a key for a cryptographic module in which the plain data set is applied in order to obtain a resulting image crypto data set, the comparison being made between the crypto data set of the reference digest and the calculated image crypto data set.

4. The method according to claim 1 wherein the test device receives the challenge by:

sending by the test device a request for authentication to the secured chip which returns the challenge to the test device upon reception of said request.

5. The method according to claim 1 wherein the secured chip returns a response message indicating to the test device a result of the comparison between the digest of the image key and the reference digest.

6. The method according to claim 1 wherein the test device and the secured chip store a plurality of common keys.

7. The method according to claim 6 wherein the test device stores a plurality of test keys and in that the secured chip stores a plurality of digests calculated each with the corresponding test key stored in the test device.

8. The method according to claim 6 wherein each common key stored in the test device and in the secured chip and each test key stored in the test device and the corresponding digests stored in the secured chip are accompanied by an index for selecting a specific test key, common key and digest during an access authentication process.

9. The method according to claim 8 wherein the cryptogram sent by the test device to the secured chip is accompanied with the index of the respective test and common keys used in said cryptogram.

10. The method according to claim 8 wherein the secured chip selects the received index for designating the common key to be used for decrypting the cryptogram and the index of the digest to be used for verifying validity of the test key determined from the cryptogram.

11. The method according to claim 9 wherein the index of the test key used in the cryptogram is encrypted with the common key corresponding to the index transmitted with the cryptogram.

12. The method according to claim 11 wherein the secured chip decrypts the index of the test key with the common key designated by the index accompanying the cryptogram, said decrypted index being used for selecting the suitable digest to verify validity of the test key determined from the cryptogram.

* * * * *